(No Model.)

F. S. ROBBINS.
NUT LOCK.

No. 528,237.

Patented Oct. 30, 1894.

Witnesses
L. C. Hills.
E. H. Bond

Inventor:
Franklin S. Robbins.
by E. B. Stocking
Attorney

UNITED STATES PATENT OFFICE.

FRANKLIN S. ROBBINS, OF ALLENTOWN, PENNSYLVANIA.

NUT-LOCK.

SPECIFICATION forming part of Letters Patent No. 528,237, dated October 30, 1894.

Application filed January 19, 1894. Serial No. 497,423. (No model.)

*To all whom it may concern:*

Be it known that I, FRANKLIN S. ROBBINS, a citizen of the United States, residing at Allentown, in the county of Lehigh, State of Pennsylvania, have invented certain new and useful Improvements in Nut-Locks, of which the following is a specification, reference being had therein to the accompanying drawings.

This invention relates to certain new and useful improvements in nut locks of that class in which is employed a nut with radial grooves to co-operate with a spring washer or plate, and it has for its object among others to provide a simple and cheap yet durable and efficient nut lock, which will be capable of easy application and not liable to become loose. I employ a spring washer or plate normally slightly curved and provided with holes for the reception of the bolts and ribs to co-operate with the nut which is formed with radial grooves into which the said ribs spring as the nut is screwed up. As the nuts are screwed up the plate or washer is spread in the direction of its length so as to straighten out and the nuts are thus held against retrograde movement on their bolts.

Other objects and advantages of the invention will hereinafter appear and the novel features thereof will be specifically defined by the appended claim.

The invention is clearly illustrated in the accompanying drawings, which, with the letters of reference marked thereon, form a part of this specification, and in which—

Figure 1:
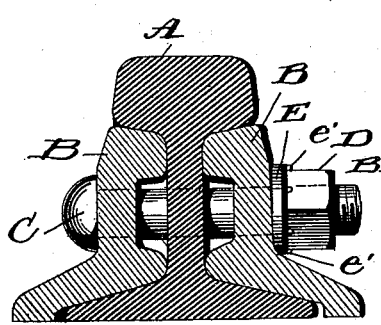
Figure 2:
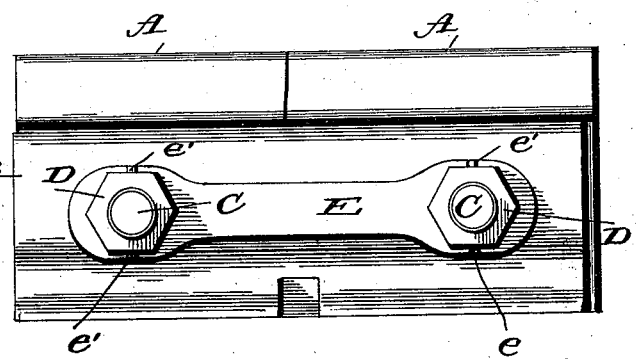
Figure 3:
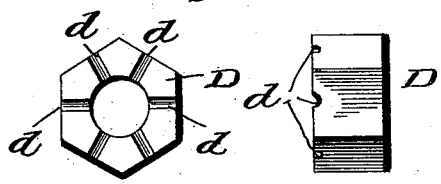
Figure 4:
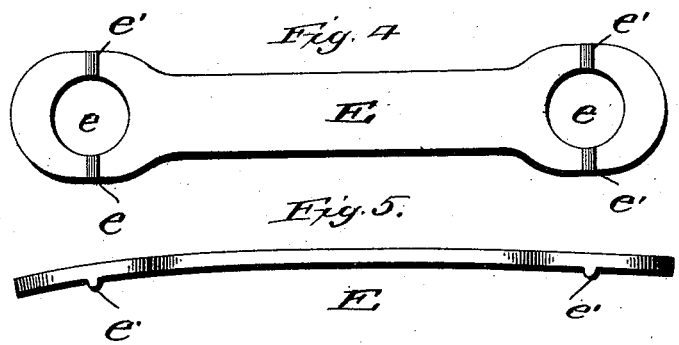
Figure 5:
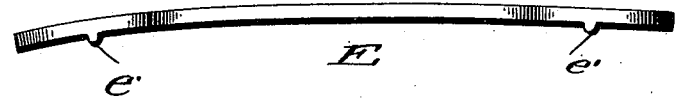

Figure 1 is a vertical cross section through a rail showing my improvements applied thereto. Fig. 2 is a side elevation thereof. Fig. 3 shows the nut, in bottom plan and side elevation. Fig. 4 is a face view of the spring plate or washer. Fig. 5 is an edge view thereof.

Like letters of reference indicate like parts throughout the several views.

Referring now to the details of the drawings by letter, A designates the adjacent ends of two rails secured together by means of my improvements.

B are the chairs or braces of any suitable or well known form adapted to bear upon the flange and under side of the tread of the rail as shown in Fig. 1.

C are the bolts of usual construction. D are the nuts therefor formed upon their inner face, that is, that nearest the chair, with a plurality of radial grooves $d$ which are preferably somewhat rounded as shown in Fig. 3.

E is a plate or washer of spring material. Its normal condition is that shown in Fig. 5, that is, slightly bowed, and near each end is formed with a bolt opening $e$, the plate being spread at such points as seen in Fig. 4 for strength, and at each opening is formed a rib or preferably two ribs $e'$ arranged diametrically opposite each other as shown in Fig. 4 and extending for a greater or less distance from the outer edge toward the opening, or from the opening outward. There may be more of these ribs on each end of the plate or washer if desired, and the ribs are preferably rounded as seen in Fig. 5.

In practice, the plate or washer is placed in position against the chair and the bolts passed through the holes in the web of the rails and then the nuts put upon the bolts. As the nuts are screwed up the plate or washer is straightened, the holes therein being sufficiently larger than the bolts, and the grooves in the face of the nuts allow them to pass over the ribs on the plate or washer until the nuts are screwed up and the plate is brought flat against the chair. Now the ribs will be seated in one set of the grooves in the nuts and any tendency to loosen will be counteracted by the spring of the plate or washer and should the nuts become from any cause slightly loosened, or not entirely screwed up, the outward spring of the plate or washer will keep the ribs in the grooves of the nuts and prevent their becoming further loosened. The nuts may be unscrewed when desired for any cause by applying force thereto, as by a wrench or other tool.

It is proposed to make the plates or washers of different sizes or lengths according to the character of the use to which the same are to be put; but in all cases the plate or washer shall be substantially that shown in Figs. 4 and 5, *i. e.*, with a substantially circular opening at each end with radial ribs and the plate or washer bent inwardly. The thickness of the plate or washer will also depend in a great measure upon the character of use, as it is evident that my improvement is applicable to uses other than for securing the adjacent ends of railway rails.

I am aware that a bowed spring plate with a single opening adapted for use in connection with a single bolt and nut has been proposed, the plate having ribs or projections to co-operate with a nut having radial grooves but this spring plate was bowed outwardly in a direction contrary to the bow of my spring plate or washer which, it will be observed from Fig. 5, is bowed inwardly so as to normally have an extended bearing upon the fish plate while its ends are, until the nuts are screwed home, practically out of contact with the fish plate. This is an important feature of the present invention for the reason that the extended bearing of the plate or washer of the fish plate between the openings serves to throw the ends of the plate outwardly to prevent loosening of the nuts in case they are but partially screwed up and loosens the frictional contact and resistance to be overcome in screwing the nut up tight. Furthermore I place my bolt openings at points farthest remote from the place where the greatest strain or pressure or bending occurs whereby liability of fracture of the plate or washer is reduced to a minimum.

What I claim as new is—

The improved nut lock herein shown and described consisting of a spring plate normally bowed inwardly at its center to have an extended bearing between its ends against a fish plate or chair, said plate being provided near each end with a lateral enlargement having an opening of greater diameter than the bolt which it receives and the outer face of the plate provided with rounded ribs extending from opposite sides of the bolt openings, bolts passed through said openings and nuts upon said bolts and provided upon their inner faces with radially disposed rounded grooves to co-operate with said ribs whereby as the nuts are screwed up said spring plate is straightened to bear substantially its entire length against said fish plate, substantially as specified.

In testimony whereof I affix my signature in presence of two witnesses.

FRANKLIN S. ROBBINS.

Witnesses:
ROBERT W. KURTZ,
THOS. O. GINKINGER.